(No Model.)
E. T. HAWKINS.
BRAKE FOR BABY CARRIAGES.
No. 406,167. Patented July 2, 1889.
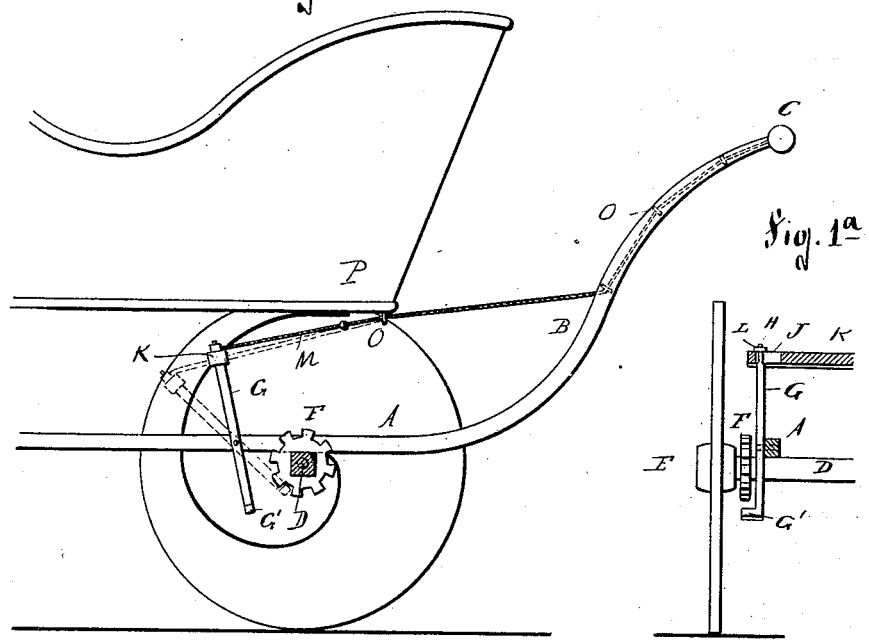
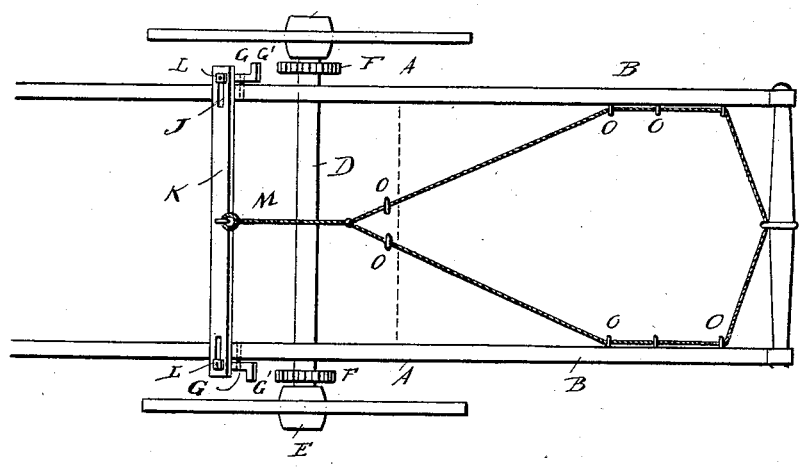
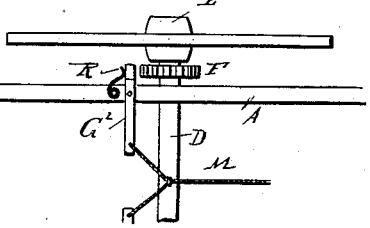
WITNESSES:
Henry Huber
Carl Karg
INVENTOR
Eugene T. Hawkins
BY
Jacque Regener
ATTORNEYS.
N. PETERS, Photo-Lithographer, Washington, D. C.

UNITED STATES PATENT OFFICE.

EUGENE T. HAWKINS, OF NEW YORK, N. Y.

BRAKE FOR BABY-CARRIAGES.

SPECIFICATION forming part of Letters Patent No. 406,167, dated July 2, 1889.

Application filed April 19, 1889. Serial No. 307,716. (No model.)

*To all whom it may concern:*

Be it known that I, EUGENE T. HAWKINS, of New York, in the county of New York and State of New York, a citizen of the United States, have invented certain new and useful Improvements in Automatic Brakes for Baby-Carriages, of which the following is a specification.

The object of my invention is to provide a new and improved device for automatically checking and stopping a baby-carriage or perambulator as soon as the handle-bar is released, thus preventing the carriage from running down inclines, off sidewalks, &c.

In the accompanying drawings, Figure 1 is a side view of part of a frame of a baby-carriage provided with my improved brake, parts being in section and others omitted. Fig. 1ª is a detail sectional view. Fig. 2 is a plan view of the frame provided with my improved brake, parts being omitted. Fig. 3 is a plan view of a modified construction.

Similar letters of reference indicate corresponding parts.

The side bars A, of the usual construction, are bent upward to form the handles B, which are united by a handle-bar C in the usual well-known manner. The axle D is secured to the side bars A, and outside of said side bars the hubs E of the wheels are mounted on the axle-pivots. To the inner end of each hub a toothed wheel or disk F is secured. Adjacent to the inner end of each hub a pawl-lever G is pivoted, the lower end of which has a pawl-lug G', adapted to engage the teeth of the corresponding disk or toothed wheel F. Each lever G is provided at its upper end with a screw-threaded stem H, which stems are passed through longitudinal slots J in the end parts of a bar K, and on said threaded stems nuts L are screwed. The bar is provided with slots to permit of adjusting the bar for frames of greater or less width. The bar K and nuts weight the upper ends of the levers G in such a manner that said upper ends swing toward the front of the carriage, whereby the lugs G are engaged with the toothed wheels or disks F, thereby locking the carriage-wheels and preventing them from rotating. A strap, chain, cord, or wire M is secured to the bar K, and is connected with two straps, chains, wires, or cords N, which are passed through eyes O O in the carriage-body P and the handles B and are fastened to the handle-bar C. When the carriage is not in motion and the handle B is not held by the attendant, the upper ends of the levers G swing to the front and lock the wheels in place. Before the carriage can be moved the attendant must grasp the upper parts of one or both of the cords, chains, or straps N with the handle-bar and pull them toward the handle-bar, whereby the levers G are brought from the position shown in dotted lines in Fig. 1 into the position shown in full lines, and their lugs G' are thus disengaged from the toothed wheels F. As soon as the handle-bar is released the levers G, under the action of their own weight and that of the bar R, swing to the front, and thus engage and lock the toothed wheels F, thereby locking the wheels of the carriage in place.

In the modification shown in Fig. 3 the pawl-levers G² are pivoted to swing horizontally, and by springs R are kept in engagement with the toothed wheels or disks F. The cords, straps, or wires N are attached in the same manner as described.

I am aware that various devices have been used; but the advantages of my improved device are that it is simple in construction, strong, durable, and cheap, can easily be applied, is automatic in its action, and locks both wheels at the same time, thus preventing the carriage from turning on one wheel, as it is apt to do when one wheel only is locked.

Having thus described my invention, I claim as new and desire to secure by Letters Patent—

1. The combination, with a baby-carriage frame, of wheels having toothed disks or wheels on their hubs, a locking-lever pivoted to the side bars of the supporting-frame of the carriage at each hub, to swing in a plane parallel with that of the side bar, a laterally-projecting lug on the lower end of each lever adapted to engage the teeth of the disks, and straps connecting with said levers and extending to the handle-bar of the carriage-frame, substantially as set forth.

2. The combination, with a baby-carriage frame and its wheels, of toothed disks or wheels secured to the hubs, locking-levers adapted to engage the toothed wheels or disks on the hubs, a cross-bar uniting said levers, and a strap secured to said bar and to the handle-bar of the frame, substantially as set forth.

3. The combination, with a baby-carriage frame and wheels, of toothed disks or wheels F on the hubs, pivoted locking-levers G, having screw-threaded stems N on their upper ends and having their lower ends adapted to engage the toothed disks or wheels F, the cross-bar K, having longitudinal slots through which the screw-stems H are passed, the nuts L, screwed on said stems, and straps extending from the bar K to the handle-bar, substantially as set forth.

In testimony that I claim the foregoing as my invention I have signed my name in presence of two subscribing witnesses.

EUGENE T. HAWKINS.

Witnesses:
OSCAR F. GUNZ,
CARL KARP.